United States Patent [19]

Beard

[11] Patent Number: 5,147,739
[45] Date of Patent: Sep. 15, 1992

[54] HIGH ENERGY ELECTROCHEMICAL CELL HAVING COMPOSITE SOLID-STATE ANODE

[75] Inventor: Kirby W. Beard, Perkasie, Pa.

[73] Assignee: Honeywell Inc., Minneapolis, Minn.

[21] Appl. No.: 561,134

[22] Filed: Aug. 1, 1990

[51] Int. Cl.$^5$ .................. H01M 6/14; H01M 4/58
[52] U.S. Cl. ..................................... 429/194; 429/218
[58] Field of Search ............................... 429/194, 218

[56] References Cited

U.S. PATENT DOCUMENTS

| | | | |
|---|---|---|---|
| H,723 | 1/1990 | Plichta et al. | 429/194 |
| 3,791,867 | 2/1974 | Broadhead et al. | 136/6 R |
| 3,898,096 | 8/1975 | Heredy et al. | 136/61 F |
| 4,041,220 | 8/1977 | Armand | 429/191 |
| 4,139,680 | 2/1979 | Schlaikjer | 429/50 |
| 4,164,069 | 8/1979 | Tomczuk | 29/623.1 |
| 4,194,062 | 3/1980 | Carides et al. | 429/194 |
| 4,208,474 | 6/1980 | Jacobson et al. | 429/191 |
| 4,302,518 | 11/1981 | Goodenough et al. | 429/104 |
| 4,317,873 | 3/1982 | LeMehaute et al. | 429/197 |
| 4,340,652 | 7/1982 | Raistrick et al. | 429/112 |
| 4,357,215 | 11/1982 | Goodenough et al. | 204/2.1 |
| 4,381,258 | 4/1983 | LeMehaute et al. | 252/519 |
| 4,423,125 | 12/1983 | Basu | 429/194 |
| 4,542,009 | 9/1985 | Palmer | 423/561 R |
| 4,547,442 | 10/1985 | Besenhard et al. | 429/209 |
| 4,585,718 | 4/1986 | Uedaira et al. | 429/224 |
| 4,604,334 | 8/1986 | Tarascon | 429/194 |
| 4,668,595 | 5/1987 | Yoshino et al. | 429/194 |
| 4,668,596 | 5/1987 | Shacklette et al. | 429/194 |
| 4,677,041 | 6/1987 | Specht | 429/206 |
| 4,684,590 | 8/1987 | Sammels | 429/194 |
| 4,687,716 | 8/1987 | Nagaura et al. | 429/145 |
| 4,751,160 | 6/1988 | Plichta | 429/197 |
| 4,758,484 | 7/1988 | Furukawa et al. | 429/194 |
| 4,770,960 | 9/1988 | Nagaura et al. | 429/194 |
| 4,804,596 | 2/1989 | Ebner et al. | 429/194 |
| 4,820,599 | 4/1989 | Furukawa et al. | 429/194 |
| 4,828,834 | 5/1989 | Nagaura et al. | 429/194 |
| 4,853,304 | 8/1989 | Ebner et al. | 429/192 |
| 4,891,282 | 1/1990 | Nagaura et al. | 429/194 |
| 4,904,552 | 2/1990 | Furukawa et al. | 429/197 |

OTHER PUBLICATIONS

Takata et al., "Manufacture of secondary lithium batteries", CA Selects: Batteries & Fuel Cells, Issue 16, 1990, p. 4.

J. J. Auborn and Y. L. Barberio, "Lithium Intercalation Cells Without Metallic Lithium," Journal of the Electrochemistry Society, vol. 134, No. 3, pp. 638–640, Mar. 1987.

J. M. Tarascon, "$Mo_6Se_6$: A New Solid-State Electrode for Secondary Lithium Batteries", Journal of the Electrochemical Society, vol. 132, No. 9, pp. 2089–2093, Sep. 1985.

T. Nagaura, "A Lithium Ion Rechargeable Battery", presented at the Third International Rechargeable Battery Seminar, Mar. 6, 1990, in Deerfield, Fla.

Abstract and references from "Preparation and Characterization of Some Lithium Insertion Anodes for Secondary Lithium Batteries", K. M. Abraham, D. M. Pasquariello, and E. B. Wilstaedt, Journal of the Electrochemical Society, vol. 137, No. 3, pp. 743 and 749, Mar., 1990.

Primary Examiner—Mark L. Bell
Assistant Examiner—Margaret V. Einsmann
Attorney, Agent, or Firm—Haughen & Nikolai

[57] ABSTRACT

Composite anodes are disclosed which consist of composites comprising lithium or lithium anode substrate in combination with one or more lithium insertion compounds consisting of transition metal chalcogenides or oxides as a coating or dispersion. Both primary and secondary cells utilizing these anodes are described.

27 Claims, 1 Drawing Sheet

HIGH ENERGY ELECTROCHEMICAL CELL HAVING COMPOSITE SOLID-STATE ANODE

BACKGROUND OF THE INVENTION

Field of the Invention

The present invention relates generally to the field of high energy, non-aqueous electrochemical cells and, more particularly, to improvements with respect to the anodes applicable to primary or secondary active metal cells and specifically those traditionally using anodes of lithium metal. The improved anodes incorporate composites comprising a lithium or lithium alloy substrate to which lithium intercalation compound is adhered, mixed, embedded or otherwise contacted as a dispersed layer, coating, laminate or mixture to provide the composite structure.

CROSS REFERENCE TO RELATED APPLICATION

Reference is made to application Ser. No. 07/561,132 filed of even date and assigned to the same assignee as the present application. That invention relates to the use of anodes incorporating active materials comprising one or more lithium insertion compounds consisting of transition metal chalcogenides or oxides capable of reversibly intercalating lithium ions.

DESCRIPTION OF THE RELATED ART

It is well known that non-aqueous, active metal cells have allowed those skilled in the art to achieve much higher energy densities or energy to weight ratios than had been possible with other combinations. The wide range of potential uses for these cells has led to a great deal of interest in improving the performance and safety of the cells and, more specifically, to developing reliable secondary or rechargeable cells utilizing these materials. Secondary or rechargeable active metal cells typically consist of a light, strongly reducing anode, normally an alkali metal such as lithium, an aprotic, non-aqueous solvent into which the appropriate quantity of an electrolyte salt of the anode metal has been dissolved to form a conductive electrolyte solution, and an oxidizing agent as the cathode material.

More recently, intercalating materials have been used for the positive cathode electrodes. U.S. Pat. No. 4,804,596 to Ebner and Lin, common of assignee with the present invention, identifies the use of intercalating materials such as $LiCoO_2$, $TiS_2$, $MoS_2$, $V_2O_5$, $V_6O_{13}$ and other such compounds as the cathode electrode when coupled with lithium metal anode electrodes in a rechargeable electrochemical cell. A further patent, U.S. Pat. No. 4,853,304, also to Ebner and Lin, and also assigned to the same assignee as that of the present invention, discloses an improved non-aqueous electrolyte solution for lithium cells in which an organic ester of formic acid, preferably methyl formate, is combined with an amount of lithium salt and an amount of $CO_2$ to provide improved electrolyte solution performance in secondary or rechargeable lithium cells. The ester-based solution is found to increase conductivity and the $CO_2$ appears to reduce anode polarization and passivation effects. A further patent to Nagaura, et al. is U.S. Pat. No. 4,828,834 which relates to a rechargeable organic electrolyte cell in which the cathode is formed of $LiMn_2O_4$ obtained by sintering manganese dioxide with either lithium carbonate or lithium iodide.

Thus, it can be seen from the above that the related art generally dealt with improvements in the electrolyte system or in cathode materials. In these electrochemical couples or known cell embodiments, lithium or other typical low density, strongly reducing metals or alloys of lithium are specified. However, the plating of lithium metal that has been removed from the cathode onto the anode electrode during charging and/or the stripping of lithium from the anode during discharging of the cell, and subsequent intercalation into the cathode, has been found to be an inefficient process. It generally results in an anode electrode dendrite growth or irreversible lithium deposition which leads to eventual failure of the cell due to internal shorting of the plates, loss of sufficient active lithium material or both.

In this regard, various additives including electrolyte dopants and electrolyte composition, cell separator materials, and various other design configurations have been attempted to minimize or negate the effects of such inefficient lithium cycling. However, even the best systems which may achieve up to 98% lithium cycling efficiency suffer from severe drawbacks. They have generally been limited to low capacity (less than one-third of the theoretical reversible capacity), shallow depths-of-discharge or low cycle life (less than 500 cycles to failure). Short cycle life is experienced despite the use of excess lithium anode capacity relative to available cathode capacity to increase anode life.

While the specific theoretical energy density of these cells based on active materials approaches 600–700 Wh/kg, the actual capacity limitations of the derated cells necessary for longer life is little better than conventional rechargeable batteries. Nickel cadmium cells, for example, are estimated at 225 Wh/kg on an active material basis. Furthermore, the cells have a limited reliability because of tendencies toward adverse anode reactions.

A secondary battery which includes a lithium intercalated graphite compound as the anode active material is disclosed in U.S. Pat. No. 4,423,125. Other lithium intercalation secondary cells using $MoO_2$ and $WO_2$ have been reported by J. J. Auborn and Y. L. Barberio in the *Journal of the Electrochemistry Society*, Vol. 134, No. 3, pp. 638–641. These, however, have not proved as successful as first hoped due to a variety of problems including the fact that the $MoO_2$ and $WO_2$ compounds both demonstrated an irreversible transition which degraded cycle capacity and life and the voltage profiles of $MoO_2$ and $WO_2$ versus lithium reference electrodes proved too high (i.e., only moderately reducing) to provide a system of adequate energy capability when coupled with higher voltage (i.e., strongly oxidizing) systems such as $LiCoO_2$ cathodes. The result is an electrochemical cell with less than 3.0 V nominal operating potential. The disclosure of U.S. Pat. No. 4,668,596 suggests the use of alkali metals (lithium and lithium alloys, etc.) in combination with alkali metal cation inserting materials, but requires the use of a conjugated backbone polymer and limits the amounts of the other electroactive materials in the anode. Thus, there remains a definite need to improve cycling ability of such cells at higher cell capacities. This would allow better advantage to be taken of the superior energy density of lithium cells with respect to rechargeable applications.

SUMMARY OF THE INVENTION

By means of the present invention the recycling efficiency of high energy density secondary or rechargeable cells has been improved by replacing the active metal anode, which has normally consisted of pure lithium metal, with a composite anode consisting of a lithium o lithium alloy substrate with which an intercalation type of compound is combined. The intercalation compound may be adhered, mixed, embedded or otherwise contacted as a finely dispersed layer, coating, laminate or mixture. Whereas the pure lithium metal anode itself has been found to exhibit poor plating and stripping properties when used in a rechargeable or secondary electrochemical cell, according to the invention it has been found that a coating or dispersion of transition metal chalcogenides or oxides on or admixed with the lithium causes a vast improvement. Adverse reactions between the electrolyte and the highly reactive lithium surfaces are minimized. Such a composite anode prevents dendrite growth during charging as well as preventing the deposition of lithium in an inactive, non-reversible form during cell use.

The selection of the intercalation compound for incorporation with the lithium metal in the anode does not appear to be critical provided that a metastable phase (thermodynamic equilibrium) exists for the intercalation compound when contacted with lithium. The selected compound must maintain its ability to transport lithium ions. However, it need not exhibit particularly high capacity, reversible lithium insertion capabilities. In this regard, for example, $Li_xCoO_2$ does not show good reversible properties with $x>1.0$ (voltages $<1.75V$ relative to a lithium reference electrode); however, cells constructed with $LiCoO_2$ coated lithium anodes have shown good cycle behavior and no evidence of undesirable phase changes, dendrites, corrosion products, electrolyte degradation, and other undesirable effects. This is true even after hundreds of cycles at full cell voltage which is 4.0V nominal for Li/LiCoO$_2$ systems, over a full range of depths of discharge. Other intercalation materials ($V_6O_{13}$, $TiS_2$, $TiO_2$, $Mo_6Se_6$ and others) may serve equally well depending on ionic transport capabilities, process ability, long-term degradation resistance and other attributes.

The composition of cathode materials and electrolytes which can be employed in the cells of the present invention do not appear to be critical to the superior operation of the anodes. Thus for example, an active cathode material of $Li_xCoO_2$ ($0<x\leq1.0$) in combination with a high conductivity ester-based electrolyte solution and a microporous polymer, i.e., polyethylene, polypropylene, etc., could be used. Preferred solutions include those in which the ester solvent is selected from methyl formate, methyl acetate and the like in combination with lithium salts including $LiAsF_6$ which may be combined with $LiBF_4$. These and other combinations including separators are disclosed in the above-referenced Ebner, et al. U.S. Pat. Nos. 4,804,596 and 4,853,304; and to the extent necessary to provide additional supporting details those specifications are deemed to be incorporated by reference in this Appliction.

The physical/mechanical configuration for the composite anode is not known to be critical and is felt to be dependent only upon maintaining an intimate dispersion or contact between the lithium and the lithium insertion compound rather than upon utilizing any particular construction or fabrication configuration or technique. The composite electrode of the invention increases cycling efficiency while, at the same time, maintaining the energy density for the Li/LiCoO$_2$ system close to the theoretical 700 Wh/kg. The combination or composite form of the anode of the present invention offers an optimized combination including the advantages of higher voltage and energy density derived from pure lithium metal anodes together with the improved cycle capabilities of lithium insertion compound anodes in a composite anode combining these two classes of materials.

BRIEF DESCRIPTION OF THE DRAWINGS

In the drawings wherein like numerals are utilized to designate like parts throughout the same.

DETAILED DESCRIPTION

In the present invention, the composite anode consisting of lithium or lithium alloy substrate to which an intercalation type of compound is added in any of a number of ways including adhering, mixing, embedding or otherwise contacted as a layer, coating, laminate or mixture, for example. Preferable intercalation compounds for the anode are those of which combine the lowest molecular weight with the highest lithium insertion capabilities at voltages closest to the lithium reference electrode. The compounds can be described using the general formula $Li_xM_aX_b$, wherein the preferred elements for M, in approximate order of desirability, appear to be scandium (Sc), titanium (Ti), yttrium (Y), and zirconium (Zr), either individually or as compounds. Higher period or group elements such as Lanthanum (La), Hafnium (Hf), vanadium (V), chromium (Cr), Niobium (Nb), molybdenum (Mo), Tantalum (Ta), Tungsten (W), Manganese (Mn), Iron (Fe), Cobalt (Co), Nickel (Ni), Copper (Cu) and Zinc (Zn), etc., can also be used, provided the lithium intercalation ability is high and the voltage levels vs. lithium are low. Although, in certain cases, others may be used, the preferred maximum oxidation state for the above are given by Roman numerals as follows: Sc(III), Ti(III), Y(III), Zr(IV), La(III), Hf(IV), V(II), Nb(III), Mo(III), Ta(IV), W(III), Cr(II), Mn(II), Fe(I), Co(I), Ni(I), Cu(I) and Zn(I). The X element(s) of the general formula, in order of preference, are oxygen (O), sulfur (S), selenium (Se) and tellurium (Te). The value of x, a and b, of course, may be expressed as an integer, fraction or decimal. It is preferable that the values of a and b be as low as possible relative to the value of x so that the lithium intercalation and ionic transport properties are maximized.

As explained above, the selection of the particular intercalation compound for incorporation with the lithium metal anode material is not important provided that a metastable phase exists for the intercalation compound when contacted with the lithium. The selected compound, then, must maintain its ability to transport lithium ions although it need not exhibit high capacity, reversible lithium insertion capabilities.

The physical/mechanical configuration for the composite anode also is not critical and is believed to be dependent only upon the structure maintaining an intimate dispersion or contact between the lithium and the lithium insertion compound rather than any particular construction or fabrication technique. Provided the intercalation compound serves as an intermediary in the deposition and stripping of lithium ions from the anode during charge and discharge, respectively, the cyclability of the electrochemical cell should be preserved.

Figure 1A:
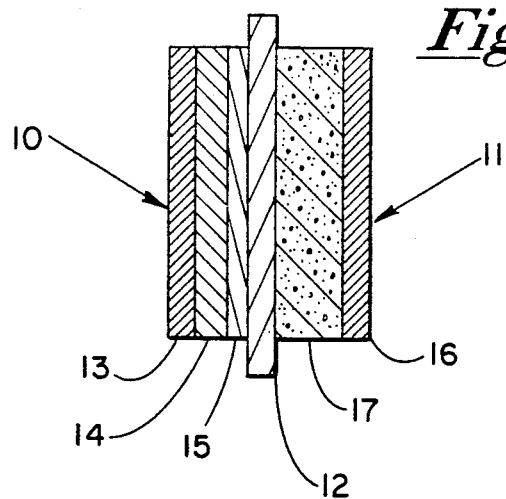
FIGS. 1A, 1B and 1C disclose cross-sectional views of three cells employing some of the possible anode configurations utilizing composite structures of the invention.
Figure 1B:
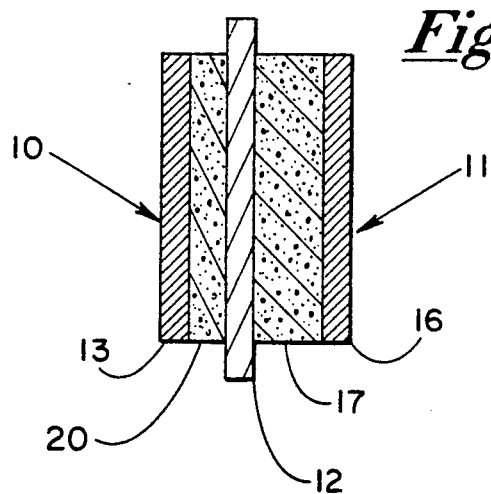
Figure 1C:
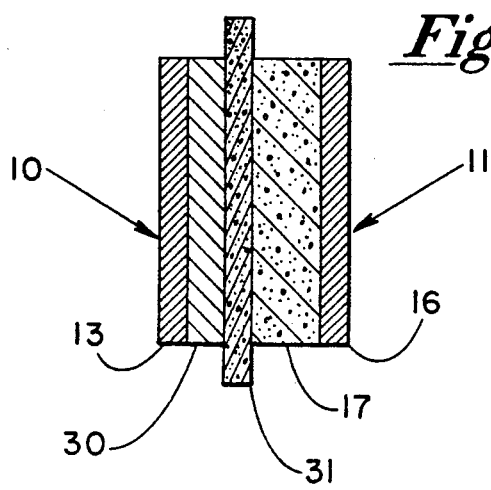

FIGS. 1A, 1B and 1C disclose typical examples of some of the possible anode configurations with respect to illustrative cell constructions. It is meant to be exemplary rather than limiting in scope. FIG. 1A is a cross-sectional view through a typical cell employing one embodiment of the composite anode of the present invention. The cell includes an anode side, denoted generally by 10, and a cathode side, shown generally by the reference numeral 11, which are divided by a separator member designated 12. The separator is normally a porous polymer membrane such as polyethylene and polypropylene and may consist of a plurality of thin layers. The anode includes a current collector 13 which is normally nickel mesh, or the like, and active material comprising a layer of lithium metal 14 coated by a layer of intercalation compound 15 in accordance with the invention. The cathode further comprises a current collecting member which may be an aluminum mesh 16 and an intercalation compound 17 which may be the same as that used in 15, however, it is normally mixed with a conductive diluent and a binder such as polytetrafluoroethylene (PTFE).

The cell depicted in FIG. 1B is similar to that of 1A except that the anode consists substantially of a lithium intercalation compound mixture 20 rather than separate layers as shown at 14 and 15 of FIG. 1A. FIG. 1C illustrates yet another embodiment with respect to the anode of the invention in which a layer of lithium 30 is flanked by a layer of intercalation compound incorporated in or as a solid state electrolyte, 31, which serves as the intercalation compound coating on the lithium, a separator and an electrolyte providing the conductive material in the cell.

In accordance with the present invention, based on the examples of FIGS. 1A-1C, it will be readily understood that a large number of possible cell configurations may be designed within the scope of the invention. With respect to the cells, only enough lithium to provide a working electrode and a substrate for laminating or compounding of the intercalation material is actually required. Some additional possible variations of electrochemical cells contemplated to be constructed with the composite anodes are also outlined further in Table I, below.

It will be appreciated that the present invention provides an electrochemical cell with the full voltage available from pure lithium anode cells without the usual dendrite growth or lithium cycling losses experienced in monolithic lithium anode cells. While the specific energy of these cells is expected to approximate that of comparable lithium battery technologies heretofore described with reference to primary cells (i.e., 700 Wh/kg theoretical energy density for the Li/LiCoO$_2$ system), cycle life will additionally be vastly improved.

TABLE I

Electrochemical Cells Using Intercalation Compound Composite Anodes*

| | General Description | Cathode Type | Separator/Electrolyte | Cell Voltage | Energy Density |
|---|---|---|---|---|---|
| I. | High voltage, high energy density LiCoO$_2$ cathode with methyl formate electrolyte. | Li$_x$CoO$_2$ (.3 ≦ x ≦ 1.0) or other high voltage (≧4 V vs. Li), high capacity (>200 mAh/gm), reversible cathode. See U.S. Pat. No. 4 804 596, Ebner, et al. | Microporous polymer separator, i.e., polyethylene, polypropylene, etc. High conductivity, ester-based electrolyte solution, including those in which the ester solvent is selected from methyl formate (HCOOCH$_3$), methyl acetate (CH$_3$COOCH$_3$) and the like. Electrolyte salts include LiAsF$_6$, LiBF$_4$ (or combinations thereof, LiClO$_4$, LiAlCl$_4$, LiGaCl$_4$, etc. See U.S. Pat. No. 4 804 596, Ebner, et al. | 4 V | 700 Wh/kg |
| II. | LiCoO$_2$ cathode and methyl formate electrolyte with CO$_2$ additive. | As in I. above plus see also U.S. Pat. No. 4 853 304, Ebner et al. | As in I. above. See also U.S. Pat. No. 4 853 304, Ebner, et al. | 4 V | 700 Wh/kg |
| III. | Intercalation cathodes with non-aqueous organic electrolytes. | MnO$_2$, MoS$_2$ or other various types. | Microporous polymer or other separate and various electrolytes. | Various (MnO$_2$: 3 V) | Various (MnO$_2$: 700 Wh/kg) |
| IV. | Conventional lithium battery cathodes (primary or secondary). | SO$_2$, SOCl$_2$, V$_2$O$_5$, FeS$_2$, CuF$_2$, (CF)$_n$, etc. | As in I.–III. above or other appropriate types. | Various (SO$_2$: 3 V) | Various (SO$_2$: 1150 Wh/kg) |
| V. | Solid state polymer | Various micro-encapsulated polymer | Various solid state, ion conductive | Various | Various |

TABLE I-continued

Electrochemical Cells Using
Intercalation Compound Composite Anodes*

| General Description | Cathode Type | Separator/Electrolyte | Cell Voltage | Energy Density |
|---|---|---|---|---|
| | electrolyte cathodes. | types. | types. | |
| VI. | Solid state polymer electrolyte anode laminate. | Standard cathodes (I.-IV.) or polymer (V.) types. | Various solid state, ion conductive types. | Various | Variuos |
| VII. | Lithium intercalation compound separator/ electrolyte. | Various as in I.-VI. above. | Non-electrically conductive intercalation compound. | Various | Various |
| VIII. | Special lithium batteries (water, air, et al. cathodes). | Special fabrications and operational modes. | Special types as appropriate. | Various | Various |

*Anode composition/constructions may include any of the lithium/intercalation compound composite anodes as disclosed herein.

In a typical example, a Li/LiCoO$_2$ cell using three times excess lithium capacity to compensate for lithium cycling efficiency loses would be expected to provide 100 full depth of discharge cycles with a 98% lithium cycling efficiency. A similarly constructed cell employing the composite anode of the present invention would provide over double the cycles (>200) if cycling efficiency losses are halved, that is, assuming a >99% lithium cycling efficiency which is clearly possible. A further halving of the cycle losses also appears readily within the grasp of the present invention, i.e., to >99.5% lithium cycling efficiency. This would again double the expected charging cycles to 400 or greater. This yields what is in effect an exponential improvement in cycle life with only a linear improvement in cycling efficiency. It is expected eventually that cycle capabilities up to 1000 full capacity, full depth of discharge cycles would not be unrealistic utilizing the anode technology in accordance with the present invention.

It is well known that, with respect to safety, lithium cells have long caused much concern. In this regard, the present invention further carries with it certain safety benefits with respect to lithium cells. The amount of "free" lithium existing in a cell poses a safety hazard. Lithium converted to the molten state (>170° C.) as a result of internal shorting, overheating, cell reversal, overcharging, or the like, is extremely reactive and can produce cell rupture or other catastrophic result. A cell with a composite anode of lithium and an intercalation compound would be rate limited by the ionic transport properties of the coating or the dispersion media, i.e., the molecular structure of the chalcogenide or oxide. This reduces the risk of cell rupture from shorting or abusive conditions. In any event, minimal amounts of lithium would be available for reaction and that amount would react in a more controlled manner with the lower potential intercalation compounds first.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different devices and that various modifications, as to equipment details, can be accomplished without departing from the scope of the invention itself.

What is claimed is:

1. An improved composite anode for high rate non-aqueous electrochemical cells including both primary and secondary cells comprising:
   (a) a reversible lithium intercalation material selected from transition metal chalcogenides having a metastable phase when contacted with lithium and the ability to reversibly transport lithium ions and having the general formula:

$Li_xM_aX_b$ where
   M is selected from transition metals having a reversible lithium insertion ability and a relatively low potential vs. lithium,
   X is selected from O, S, and Se,
   x, a and b are numbers representing relative combining rations where $0 < x < 9$ $0.5 \leq a \leq 6$ and $1.0 \leq b \leq 9$;

(b) an amount of material selected from lithium or a lithium alloy or combinations thereof;
   (c) wherein the node intercalation material is disposed to function as an intermediary ion transport medium between the lithium or lithium alloy and an electrolyte.

2. The composite anode of claim 1 wherein M is selected from one or more of Sc, Ti, Y, Zr, V, Nb, Mo, Ta, W, Cr, Mn, and Co.

3. The composite anode of claim 1 wherein M is selected from one or more of Sc(III), Ti(III), Y(III), Zr(IV), V(II), Nb(III), Mo(III), Ta(IV), W(III), Cr(II) and Mn(II) where the numerals refer to maximum theoretical oxidations states.

4. The composite anode of claim 3 wherein M is selected from Sc(II), Ti(II), Y(II), Zr(II), V(I), Nb(II), Mo(II), Ta(III), W(II), Cr(I) and Mn(I) where the numerals refer to the maximum theoretical oxidation states.

5. The composite anode of claim 1 wherein the intercalation material comprises compounds wherein M is selected from Sc, Ti, Y, Zr and combination thereof.

6. The composite anode of claim 1 wherein the intercalation material comprises compounds wherein M is selected from Sc, Ti, Y, Zr, V, Nb, Mo, Ta, W, Cr, Mn and combination thereof and wherein X is 0.

7. The composite anode of claim 1 wherein the lithium or lithium alloy and the lithium intercalation material form separate and distinct adjacent layers.

8. The composite anode of claim 5 wherein the lithium or lithium alloy and the lithium intercalation material form separate and distinct adjacent layers.

9. The composite anode of claim 6 wherein the lithium or lithium alloy and the lithium intercalation material form separate and distinct adjacent layers.

10. The composite anode of claim 1 wherein the lithium or lithium alloy is combined with the lithium intercalation material in the same layer.

11. The composite anode of claim 5 wherein the lithium or lithium alloy is combined with the lithium intercalation material in the same layer.

12. The composite of claim 6 wherein the lithium or lithium alloy is combined with the lithium intercalation material in the same layer.

13. An electrochemical cell comprising:
(a) a composite anode consisting of:
a reversible lithium intercalation material selected from transition metal chalcogenides having a metastable phase when contacted with lithium and the ability to reversibly transport lithium ions and having the general formula:

$Li_xM_aX_b$ where
M is selected from transition metals having a reversible lithium insertion ability and relatively low potential vs. lithium,
X is selected from O, S, and Se,
x, a and b are numbers representing relative combining ratios where $0 < x < 9$ $0.5 \leq a \leq 6$ and $1.0 \leq b \leq 9$;

an amount of lithium, lithium alloy or a combination thereof,
wherein the anode intercalation material is disposed to function as an intermediary ion transport medium to minimize direct contact between the lithium or lithium alloy and an electrolyte;
(b) a compatible cathode having a cathode active material and a current collector; and
(c) an electrolyte system.

14. The electrochemical cell of claim 13 wherein the cathode comprises an active metal material and a current collector and the electrolyte system further comprises a solid-state electrolyte separator.

15. The electrochemical cell of claim 13 wherein the cathode further comprises at least a second reversible lithium intercalation compound selected from a group compatible with the intercalation material of the anode and wherein the electrolyte system is non-aqueous with or without co-solvents.

16. The electrochemical cell of claim 15 wherein the intercalation compound of the anode and the cathode are the same varying in the degree of lithium intercalation such that the anode is Li doped and the cathode is Li depleted.

17. The electrochemical cell of claim 15 wherein the electrolyte system is a non-aqueous organic ester-based electrolyte solution containing an amount of lithium salt.

18. The electrochemical cell of claim 15 wherein the intercalation compound of the cathode has a potential of at least 4.0 V versus lithium and >200 mAh/gm reversible capacity.

19. An active metal non-aqueous electrochemical cell comprising:
(a) a composite anode further comprising:
an amount of first material consisting essentially of reversible lithium intercalation material selected from transition metal chalcogenides having a metastable phase when contacted with lithium and the ability to reversibly transport lithium ions and having the general formula:

$Li_xM_aX_b$ where
M is selected from transition metals having a reversible lithium insertion ability and the relatively low potential vs. lithium,
X is selected from O, S, and Se,
x, a and b are numbers representing relative combining ratios where $0 < x < 9$ $0.5 \leq a \leq 6$ and $1.0 \leq b \leq 9$;

an amount of a second material consisting essentially of lithium, lithium alloy or a combination thereof,
wherein the anode intercalation material functions as an intermediary ion transport medium to minimize direct contact between the lithium or lithium alloy and an electrolyte, and
wherein the first and second materials are disposed to form separate layers or combine as a dispersion of the second material in the first configured as a distinct layer;
(b) a cathode having a cathode active material comprising a third material in the form of a reversible lithium intercalation compound compatible with that of the anode; and
(c) a non-aqueous electrolyte system.

20. The electrochemical cell of claim 19 wherein the first and second anode material are in the form of a layered structure selected from the first material forming a coating on said second material and laminates thereof of the first and second materials.

21. The electrochemical cell of claim 13 where in M is selected from Sc, Ti, Y, and Zr and combination thereof and wherein the electrolyte comprises non-aqueous organic ester-based electrolyte solution containing an amount of at least one lithium salt.

22. The electrochemical cell of claim 13 wherein the cathode active material is selected from a group consisting of $SO_2$, $SOCl_2$, $(CF)_n$, $FeS_2$, $CuF_2$, $MnO_2$, $Bi_2P$-

$b_2O_5$, $V_2O_5$ and the electrolyte is selected from non-aqueous electrolytes with or without co-solvents.

23. The electrochemical cell of claim 21 wherein the cathode active material is selected from a ground consisting of $SO_2$, $SOCl_2$, $(CF)_n$, $FeS_2$, $CuF_2$, $MnO_2$, $Bi_2Pb_2O_5$, $V_2O_5$ and the electrolyte is selected from non-aqueous electrolytes with or without co-solvents.

24. The electrochemical cell of claim 20 wherein the anode intercalation compound is selected from $Li_xTiO_2$, $Li_xTi_2O_3$ (where $0 < x \leq 2.0$) and mixtures thereof.

25. The electrochemical cell of claim 22 wherein the anode intercalation compound is selected from $Li_xTiO_2$, $Li_xTi_2O_3$ (where $0 < x \leq 2.0$) and mixtures thereof.

26. The electrochemical cell of claim 19 wherein the second material is mixed as a distinct dispersion in the first material.

27. The electrochemical call of claim 19 wherein the anode comprises an amount of lithium covered by a layer of the first material which thereby forms the electrolyte and separator for the cell.

* * * * *

UNITED STATES PATENT AND TRADEMARK OFFICE
CERTIFICATE OF CORRECTION

PATENT NO. : 5 147 739
DATED : September 15, 1992
INVENTOR(S) : Kirby W. Beard Page 1 of 2

It is certified that error appears in the above-identified patent and that said Letters Patent is hereby corrected as shown below:

In column 8, line 43, delete "rations" and insert -- ratios -- .

In column 10, line 17, after "of", insert -- a -- .

In column 10, line 28, delete "the" and insert -- a -- .

In column 10, line 52, delete "int he" and insert -- in the -- .

In column 10, line 57, delete "material" and insert -- materials -- .

In column 10, line 62, delete "combination" and insert -- combinations -- .

In column 11, line 4, delete "ground" and insert -- group -- .

UNITED STATES PATENT AND TRADEMARK OFFICE
CERTIFICATE OF CORRECTION

PATENT NO. : 5,147,739

DATED : September 15, 1992

INVENTOR(S) : Kirby W. Beard

It is certified that error appears in the above-indentified patent and that said Letters Patent is hereby corrected as shown below:

Column 10, line 61, change "where in" to --wherein--.

Signed and Sealed this

Nineteenth Day of October, 1993

Attest:

BRUCE LEHMAN

Attesting Officer

Commissioner of Patents and Trademarks